United States Patent Office 3,565,964
Patented Feb. 23, 1971

3,565,964
ALUMINO-SILICATE CATALYZED REACTIONS OF POLYCYCLIC AROMATIC HYDROCARBONS IN THE PRESENCE OF HYDROGEN
Ronald D. Bushick, Glen Mills, and Alfred E. Hirschler, Springfield, Pa., assignors to Sun Oil Company, Philadelphia, Pa., a corporation of New Jersey
No Drawing. Filed Aug. 5, 1968, Ser. No. 749,932
Int. Cl. C07c 15/28, 15/29
U.S. Cl. 260—668
12 Claims

ABSTRACT OF THE DISCLOSURE

Polycyclic aromatic hydrocarbons can be converted to other polycyclic hydrocarbons by a catalytic conversion process comprising contacting the hydrocarbon with an acidic alumino-silicate zeolite in the presence of from 5–5000 p.s.i. of hydrogen at an elevated temperature (e.g., at least 40° C.) for a period of time sufficient to allow the catalytic conversion to occur. For example, sym-octahydrophenanthrene (s-OHP) can be converted to sym-octahydroanthracene by so contacting the s-OHP with a GdHY zeolite at 80–120° C. in the presence of 15–250 p.s.i.g. of hydrogen at a weight hourly space velocity in the range of 0.1–20 (preferably 0.25–10).

CROSS REFERENCES TO RELATED APPLICATIONS

Acidic alumino-silicate zeolites which can be utilized in the subject process have been described in copending application Ser. No. 590,225, filed Oct. 28, 1966, now U.S. 3,396,203, of Ronald D. Bushick entitled "Alumino-Silicate Catalyzed Reactions of Polycyclic Aromatic Hydrocarbons" and in copending application Ser. No. 750,-432, filed Aug. 2, 1968, of Ronald D. Bushick entitled "Process for Producing Sym-Octohydroanthracene From Sym-Octohydrophenanthrene," and in copending application Ser. No. 581,129, filed Aug. 25, 1966 and now abandoned, of Francis William Kirsch, David S. Barmby and John D. Potts entitled "Process for Paraffin-Olefin Alkylation" and in copending application Ser. No. 716,190, filed Mar. 26, 1968 of Francis William Kirsch, David S. Barmby and John D. Potts entitled "Process for Paraffin-Olefin Alkylation" and in copending application Ser. No. 715,998, filed Mar. 26, 1968 of Francis William Kirsch, David S. Barmby and John D. Potts entitled "Gd Zeolite and Hydrocarbon Conversion Process With Gd Zeolite Catalyst" and in copending application Ser. No. 715,994, filed Mar. 26, 1968 of Alfred E. Hirschler entitled "Hydrocarbon Conversion Process With Gd Catalyst" and in copending application Ser. No. 718,980, filed Mar. 26, 1968 of Ronald D. Bushick entitled "Combination of Gd Alumino-Silicate Catalyst and Hydrogenation Catalyst" and in copending application Ser. No. 749,714, filed Aug. 2, 1968 of Francis William Kirsch, David S. Barmby and John D. Potts entitled "Dy Zeolite and Hydrocarbon Conversion Process with Dy Zeolite Catalyst," and in copending application Ser. No. 749,739, filed Aug. 2, 1968 of Ronald D. Bushick entitled "Combination of Dy Alumino-Silicate Catalyst and Hydrogenation Catalyst," all of these being assigned to Sun Oil Company. The disclosure of all of the above-cited applications is hereby incorporated in the present application.

BACKGROUND OF THE INVENTION

In the aforementioned copending United States patent applications having the Ser. Nos. 590,225, 715,994, 715,-998 and 718,980, and in the copending applications entitled "Dy Zeolite and Hydrocarbon Conversion Process With Dy Zeolite Catalyst" and "Combination of Dy Alumino-Silicate Catalyst and Hydrogenation Catalyst," processes are disclosed for the catalytic conversion of polycyclic aromatic hydrocarbons (e.g., s-OHP to s-OHA) comprising contacting a hydrocarbonaceous feed, in a conversion zone at an elevated temperature, with an acidic alumino-silicate catalyst for sufficient time to permit the conversion to occur. The present invention is an improvement on said processes, comprising (in one aspect) conducting such processes in the presence of from 5–5000 p.s.i. of hydrogen (preferably, 15–1500 p.s.i. of hydrogen).

SUMMARY OF THE INVENTION

A hydrocarbon conversion process comprises contacting a polycyclic aromatic hydrocarbon (e.g., dicyclohexyl) in a conversion zone at an elevated conversion temperature with an acidic alumino-silicate catalyst in the presence of from 5–5000 p.s.i. of hydrogen gas and recovering an upgraded hydrocarbon conversion product (e.g., dimethyl decalins), said acidic alumino-silicate catalyst containing less than one alkali metal cation and at least one cationic monovalent, divalent or trivalent metal (e.g., $Gd^{+3}$), metal oxide (e.g., $Gd=O$ or $^{+2}Gd-O-Gd^{+2}$), metal hydride (e.g., $^{+2}GdH$), metal hydroxide (e.g., $^{+2}Gd-OH$) or mixed metal hydride hydroxide

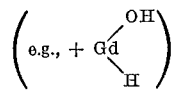

for every twelve atoms of aluminum in said alumino-silicate framework.

FURTHER DESCRIPTION OF THE INVENTION

The metals (and catalysts) can be those disclosed in the aforementioned United States patent applications, however, in the preferred cations, the metal of the cations consists essentially of one or more metals from the group consisting of Al, Mg, Ca, Sr, Ba, Cr, Mn, Zn, Ag, Cd, In, Sn, Sc, Y, La, Ce, Pr, Nd, Sm, Eu, Gd, Tb, Dy, Ho, Er, Tm, Yb, Lu, Th and U. Halide adjuvants (e.g., Ser. Nos. 581,129 and 716,190 and of previously cited applications entitled "Dy Zeolite and Hydrocarbon Conversion Process With Dy Zeolite Catalyst" and "Combination of Dy Alumino-Silicate Catalyst and Hydrogenation Catalyst") can also be present in the reaction zone.

Although a hydrogenation catalyst (e.g., see Ser. No. 590,225 and Ser. No. 718,980) can also be present in the conversion zone (as for converting s-OHP to s-OHA), we prefer that the catalyst (and reaction zone) not contain such metals (or cations of such metals) as Co, Ni, Cu, Nb, Mo, Ru, Th, Pd, W, Re, Os, Ir or Pt.

The present invention is especially useful for converting s-OHP to its isomer, s-OHA, or s-OHA to its isomer, s-OHP, by a process comprising contacting a feed rich in one of the said isomers with an acidic alumino-silicate catalyst in the presence of 5–1500 p.s.i. of hydrogen at a temperature above 40° C. but below cracking temperature, whereby isomerization of the contacted isomer to the other isomer occurs. From 1 to 20 (preferably, from 2–12) percent of water, based on the weight of the catalyst, can also be present in the contact zone (some or all of this water can be initially present in the catalyst, as in the form of hydroxyl groups). Means of recovering said other isomer from the isomerization mixture are disclosed, for example, in the aforementioned application Ser. No. 590,225 and in the aforementioned copending application entitled "Process of Producing Sym-Octahydroanthracene from Sym-Octahydrophenanthrene." The resulting depleted isomerization mixture can be recycled and further contacted with the catalyst.

The preferred acidic alumino-silicate catalyst comprises a crystalline zeolite (and, more preferably, is at least 50% crystalline). Also preferred is an acidic aluminosilicate catalyst, wherein the atomic ratio Al/Si is from 0.65 to 0.2 and wherein (on analysis prior to said contacting) there is at least one trivalent or divalent metal, metal oxide or metal hydroxide cation for every twelve atoms of aluminum in said alumino-silicate. Also preferred as such metals of the cation are the rare earths, especially Y, La and Gd.

In the conversion of s-OHP to s-OHA (or of s-OHA to s-OHP), one preferred catalyst is the Gd aluminosilicate described in the aforementioned U.S. patent applications, Ser. No. 715,994, Ser. No. 715,998 and Ser. No. 718,980. For this conversion, the preferred conditions are a temperature above 50° C. (more preferably in the range of 80–120° C.) at a weight hourly space velocity of 0.1–20 (more preferably 0.25–10), and in the presence of 5–500 (more preferably 15–250) p.s.i. of hydrogen. The hydrogen partial pressure in the conversion zone is preferably from 15 to 100% of the total gas pressure. The process can be conducted when the hydrocarbonaceous feed is contacted in liquid, vapor or mixed phase (e.g., at reflux or in trickle phase). The hydrogen can be recycled (as at rates up to 10,000 s.c.f./bbl. of feed). If the catalyst activity appreciably decreases in time, the catalyst can be separated from the hydrocarbon reactants and regenerated, as by burning in air. After such burning, water can be added by the means disclosed in the previously cited copending applications.

ILLUSTRATIVE EXAMPLES

The following examples illustrate the preparation of an acidic Gd alumino-silicate catalyst (GdHY) which can be used in the subject process and illustrate the use of the GdHY catalyst in the subject process to isomerize s-OHA to s-OHP and to isomerize s-OHP to s-OHA.

EXAMPLE I

An $NH_4Y$ zeolite was prepared by contacting 625 g. NaY zeolite (sorptometer surface area of 758 m.$^2$/g.) for 12 exchange cycles with fresh portions of a boiling (105° C.) solution of 535 g. $NH_4Cl$ in 1425 mls. distilled water at 100° C. (i.e., a 5.5 normal solution). The fresh solution had a pH at 100° C. of 4.2–4.5 (which, when necessary, was obtained by adjusting with either $NH_4OH$ or HCl). Prior to contact the solution was filtered to insure that it is free of undissolved salt particles. The equilibrated NaY zeolite (in ambient air for 24 hours) had a 25.7% weight loss on ignition and analyzed 10.16% Na, 45.99% $SiO_2$ and 16.60% $Al_2O_3$. On a water-free basis, the NaY contained 0.442 moles Na$^+$ per 100 g. zeolite. Each ammonium exchange cycle was for a ½ hour contact period followed by adjusting the pH to 5.5 with $NH_4OH$ and then filtering the hot (80–90° C.) slurry (filtrate pH ranged from 4.5 to 5.2). After the 12 $NH_4Cl$ exchange cycles, the zeolite was washed for 8 cycles of 15 minutes contact, and then filtered, with 1.4 liters each of distilled $H_2O$. After this washing a test with silver nitrate showed that the filtrate contained no Cl—.

The washed zeolite cake was broken up and dried over night at 140° C. On the next day, the dry zeolite was pulverized and screened through a 100 mesh screen. The resulting $NH_4Y$ zeolite (after equilibration in ambient air for 24 hours) had a weight loss on ignition at 1000° C. (for two hours) of 29.9%, and analyzed 4.70 wt. percent N (0.426 moles $NH_4^+$/100 g. of water-free $NH_4Y$ zeolite). It contained less than 0.1 wt. percent Na (or less than 0.006 moles Na/100 g. of water-free zeolite).

47.7 g. of this $NH_4Y$ zeolite was then exchanged for 16 cycles each with 239 mls. of a pH 4.3 solution of 67 g. $Gd(NO_3)_3 \cdot 5H_2$ (99.9% pure) in 3.82 liters distilled water. The 4.3 pH was obtained by adjusting the pH 2.4 Gd-nitrate solution with $NH_4OH$. At the beginning of each contact period the zeolite slurry was adjusted to pH 5.0. The filtrate pH ranged from 4.6 to 5.2. After the 16 Gd-nitrate exchange cycles, the resulting $GdNH_4Y$ zeolite was washed for 8 cycles each, of 15 minutes contact, with ½ liter distilled $H_2O$ (a diphenyl amine test showed that no nitrate ion was present in the filtrate from the 8th wash cycle). The $GdNH_4Y$ was dried over night at 140° C. and then put through a 100 mesh screen.

The resulting 100 mesh $GdNH_4Y$ zeolite (after equilibration in ambient air) had a 24.1% weight loss on ignition (for 2 hours at 1000° C.). The $GdNH_4Y$ zeolite contained 0.46 wt. percent N (0.043 moles $NH_4^+$/100 g. water-free $GdNH_4Y$), 14.05 wt. percent Gd (0.116 moles Gd/100 g.) and less than 0.1% Na (less than 0.006 moles Na/100 g.).

The 100 mesh $GdNH_4Y$ was activated by heating slowly in flowing dry air in a split tube furnace to 500° C., held at 500° C. for 4 hours and bottled hot.

The activated GdHY zeolite had a sorptometer surface area of 757 m.$^2$/g.

EXAMPLE II 10 ml. portions of feed hydrocarbon (s-OHA or s-OHP) and 4.5 g. portions of the activated GdHY catalyst of Example I, were placed in a magnetically stirred Parr bomb into which hydrogen was introduced until the pressure was 110 p.s.i.g. The bomb was then heated to 100° C. and that temperature was maintained for a desired period of time, after which the bomb was cooled to room temperature, the pressure was reduced and a sample of the catalyst-free reaction product was taken for chromatographic analysis.

The results of a series of such runs (designated as Runs A, B, D and E, and of blank runs (Runs C and H) made with no hydrogen gas present in the bomb) is summarized in the following Tables 1 and 2. In Table 1, the feed hydrocarbon was s-OHA. In Table 2, the feed hydrocarbon was s-OHP. Runs F and G in Table 2 are runs which are reported in the previously cited application Ser. No. 590,225, using a mixed rare earth hydrogen Y zeolite and no hydrogen pressure.

s-OHA can be separated (as by crystallization) from the reaction mixture and dehydrogenated to produce anthracene.

The subject process can also be used to convert prehnitene to durene or to convert durene to prehnitene.

TABLE 1.—CONVERSION OF s-OHA TO s-OHP AT 100° C.

| Run | Type catalyst | Reaction time, hrs. | H$_2$, p.s.i.g. | Percent conversion | Product distribution (wt. percent) | | |
|---|---|---|---|---|---|---|---|
| | | | | | OHA | OHP | Other |
| A | GdHY | 1.5 | 110 | 41.2 | 58.8 | 41.2 | |
| B | GdHY | 5 | 110 | 41.0 | 59.0 | 41.0 | |
| C | GdHY | 1.5 | None | 44.4 | 55.6 | 44.4 | |

TABLE 2.—CONVERSION OF s-OHP TO s-OHA AT 100° C.

| Run | Type catalyst | Reaction time, hrs. | H$_2$, p.s.i.g. | Percent conversion | Product distribution (wt. percent) | | |
|---|---|---|---|---|---|---|---|
| | | | | | OHA | OHP | Other |
| D | GdHY | 1.5 | 110 | 56.3 | 54.2 | 43.7 | 2.1 |
| E | GdHY | 5 | 110 | 57.2 | 54.5 | 42.8 | 2.7 |
| F | REHY | 1 | None | 12.2 | 10.2 | 87.8 | 2.0 |
| G | REHY | 5 | None | 25.4 | 20.8 | 74.6 | 4.5 |
| H | GdHY | 1.5 | None | 14.3 | 12.2 | 85.7 | 2.1 |

We claim:

1. Process for converting s-OHP to its isomer, s-OHA, or s-OHA to its isomer, s-OHP, which comprises contacting a feed rich in one of the said isomers with an acidic alumino-silicate catalyst in the presence of from 5–5000 p.s.i. of hydrogen at a temperature above 40° C. but below cracking temperature, whereby isomerization of the contacted isomer to the other isomer occurs.

2. Process according to claim 1 wherein said other isomer is recovered from the isomerization mixture.

3. Process according to claim 2 wherein after recovery of said other isomer the resulting depleted isomerization mixture is recycled and further contacted with said catalyst.

4. Process according to claim 1 wherein said acidic alumino-silicate catalyst comprises a crystalline zeolite.

5. Process according to claim 4 wherein said contacting is effected in the presence of from 2 to 12 percent of water, based on the weight of said catalyst.

6. Process according to claim 1 wherein said catalyst has an Al/Si atomic ratio of from 0.65 to 0.2 and contains at least 1 trivalent or divalent metal, metal oxide or metal hydroxide cation for every 12 atoms of aluminum in said alumino-silicate.

7. Process according to claim 6 wherein said cation comprises at least one rare earth.

8. Process according to claim 7 wherein s-OHP is converted to s-OHA by contact with an acidic Gd alumino-silicate catalyst in the presence of from 15–250 p.s.i. of hydrogen.

9. Process according to claim 8 wherein said s-OHA is separated from the reaction mixture and dehydrogenated to produce anthracene.

10. Process according to claim 8 wherein said catalyst is at least 50% crystalline.

11. Process according to claim 1 wherein said contacting is in the presence of from 15–1500 p.s.i. of hydrogen.

12. Process according to claim 11 wherein said catalyst comprises a crystalline zeolite.

References Cited

UNITED STATES PATENTS 3,396,203   8/1968   Bushick _____ 260—668

CURTIS R. DAVIS, Primary Examiner